United States Patent
Hosdez et al.

[11] Patent Number: 5,803,813
[45] Date of Patent: Sep. 8, 1998

[54] TRIPOD ROLLER FOR A CONSTANT VELOCITY UNIVERSAL JOINT

[75] Inventors: Didier Hosdez, Haguenau; Pierre Alber, Reichshoffen, both of France

[73] Assignee: Ina Walzlager Schaeffler KG, Germany

[21] Appl. No.: 676,115

[22] PCT Filed: Apr. 12, 1995

[86] PCT No.: PCT/EP95/01359

§ 371 Date: Jul. 11, 1996

§ 102(e) Date: Jul. 11, 1996

[87] PCT Pub. No.: WO95/31647

PCT Pub. Date: Nov. 23, 1995

[30] Foreign Application Priority Data

May 16, 1994 [DE] Germany .......................... 9408057 U

[51] Int. Cl.[6] .................................................. F16D 3/205
[52] U.S. Cl. ........................... 464/111; 464/132; 464/905
[58] Field of Search ................................... 464/111, 120, 464/123, 124, 132, 905

[56] References Cited

U.S. PATENT DOCUMENTS 4,484,900  11/1984  Orain ...................................... 464/111
4,808,145   2/1989  Mizukoshi .............................. 464/111
5,376,050  12/1994  Krude et al. ............................ 464/111

FOREIGN PATENT DOCUMENTS

| 885904 | 9/1943 | France . |
| 2079747 | 11/1971 | France . |
| 2198576 | 3/1974 | France . |
| 2580750 | 10/1986 | France . |
| 4130956 | 4/1993 | Germany ............................... 464/111 |
| 4142214 | 7/1993 | Germany ............................... 464/111 |
| 57-83721 | 5/1982 | Japan ..................................... 464/111 |

*Primary Examiner*—Eileen A. Dunn
*Attorney, Agent, or Firm*—Bierman, Muserlian and Lucas

[57] ABSTRACT

A tripod type constant velocity universal joint comprising an outer joint member having longitudinal recesses arranged in spaced relationship on a periphery thereof, and trunnions symmetrically arranged on a tripod spider, said trunnions located in said recesses of the outer joint member by tripod rollers mounted on rolling elements, characterized in that an inner ring formed without chip removal from sheet metal is arranged between each trunnion and respective rolling elements, the inner ring, the tripod roller and the rolling elements form a roller assembly, and the inner ring comprises at least first and second radially stepped end flanges which form radially inner stops for the rolling elements and radially outer stops for the tripod roller.

11 Claims, 2 Drawing Sheets

TRIPOD ROLLER FOR A CONSTANT VELOCITY UNIVERSAL JOINT

The invention concerns a constant velocity universal joint of a tripod type comprising an outer joint member having longitudinal recesses arranged in space relationship on a periphery thereof and trunnions symmetrically arranged on a tripod spider, said trunnions engaging into said recesses of the outer joint member by tripod rollers mounted on to rolling elements.

In a universal joint of this type known from DE-A-41 13 944, the rolling elements are mounted directly on the trunnion of the inner joint member, that is to say, on the tripod spider. Stop rings guided on the trunnion at the ends of the rolling elements form an axial stop for the rolling elements while axial locking is achieved by a circlip against which the stop ring bears, the circlip being guided in a circumferential groove on the free end of the trunnion. This structure necessitates a polished and surface-hardened rolling element raceway on the trunnion. Assembly involves several time-consuming and therefore costintensive work steps for the mounting of individual components. Thus, for example, the stop rings have to be pushed onto the trunnion, the circlip has to be inserted into the circumferential groove and be engaged by the profiled stop ring before the rolling elements can be inserted. Finally the tripod roller is pushed over the rolling elements.

OBJECTS OF THE INVENTION

It is an object of the invention to create a tripod type universal joint having fewer components and an optimized design space requirement so that manufacturing and assembly costs of the constant velocity universal joint are reduced.

THE INVENTION

A tripod type constant velocity universal joint comprising an outer joint member having longitudinal recesses arranged in spaced relationship on a periphery thereof, and trunnions symmetricaly arranged on a tripod spider, said trunnions engaging into said recesses of the outer joint member by tripod rollers mounted on rolling elements, is characterized in that an inner ring (2) formed without chip removal from sheet metal is arranged between each trunnion (15) and respective rolling elements (3), the inner ring (2), the tripod roller (4) and the rolling elements (3) form a roller assembly (1), and the inner ring (2) comprises stepped end flanges (5,6,10) which form separate, mutually offset axial stops for the rolling elements (3) and the tripod roller (4). The solution of the invention comprises arranging an inner ring of sheet metal between the rolling elements and the trunnion, with the inner ring forming a roller assembly with a tripod roller and the rolling elements.

GB-B-15 74 765 discloses a rolling bearing having an inner ring whose flanges bent at a right angle form a common axial stop for the rolling elements and the outer ring of the rolling bearing. This prior art structure is not suitable for use in constant velocity universal joints because in such joints provision must be made for a relative axial displacement between the rolling elements and the tripod roller. This requirement is met by the inner ring of the invention which comprises end flanges forming separate, mutually offset axial stops for the rolling elements and the tripod roller.

The inner ring in the configuration of the invention comprises flanges which form axially offset stops thus advantageously permitting a free orientation of the tripod roller within the constant velocity universal joint. Particularly during operation of the joint at large bend angles, a relatively large axial displacement takes place between the rolling elements and the tripod roller. The tripod assembly of the invention advantageously comprises fewer components than known structures so that costs are reduced. Moreover, the tripod assembly of the invention is further characterized by a smaller overall axial length. Two thin-walled flanges of the inner ring of the invention replace the prior art stop rings as well as the circlip with its additional requirement of a circumferential groove. The reduced overall axial length effects a reduction of the design space requirement of the constant velocity universal joint.

A further cost reduction results from the fact that the hitherto required surface treatment, e. g. hardening and grinding of the trunnion to enable a direct guidance of the rolling elements thereupon can be omitted by use of the inner ring of the invention. The inner ring formed from thin sheet metal advantageously has no negative influence on the radial design dimensions of the constant velocity universal joint.

In an advantageous embodiment of the invention, the roller assembly is a pre-assemblable unit consisting of the tripod roller, the rolling elements and the inner ring whose end flanges assure a coherence of the assembly. Advantageously, this pre-assembled unit can be mounted directly on the trunnion of the tripod spider so that mounting is simplified and time and cost factors are optimized. Moreover, the inseparable unit being safe from falling apart during mounting, it is suitable for mounting by automatic means such as robots. Another advantage is the simplification of storage and stockkeeping of spare parts.

In a further embodiment of the invention the flanges have a radially stepped configuration with the axial extent of the first step being matched to the length of the rolling elements. The second step on each side of the tripod roller comprises an axial stop spaced from the end of the tripod roller so that a displacement of the tripod roller relative to the rolling elements is possible in both directions. The axial stop for the tripod roller may be optionally configured as a flange or as a retaining lug. The axial extents of the axial stops for the tripod roller can differ from each other. Due to differing displacements of the tripod roller in the two axial directions in the installed state, the flange nearer the free end of the trunnion is arranged at a larger axial distance than the opposite flange.

The flange of the inner ring nearer the center of the tripod spider comprises elastic retaining lugs which overlap the inner diameter of the tripod roller in radial direction and yield resiliently during assembly. This enables the tripod roller to be pushed in an axial direction on to the inner ring already equipped with rolling elements, and the inner ring to be inserted into the reception bore of the tripod roller.

The inner ring is secured to the trunnion by an interference fit, with the inner ring being matched in dimension to the outer contour of the trunnion. The inner ring may also be fixed by axial securing, preferably by a local radial stamping of the end of the trunnion towards the roller assembly.

The fatigue strength of the trunnion can be improved if an undercut is provided in the region of transition between the peripheral surface of the trunnion and the inner portion of the tripod spider. The undercut is preferably in the form of a circumferential groove which is an effective means for reducing stress concentration and stress peaks in the trunnion.

The inner ring of the invention is made by deep drawing which leads to a further reduction of costs particularly in large-scale manufacturing.

To obtain the required high strength, the inner ring has be heat treated. Preferably, the entire inner ring would be subjected to the heat treatment, however, as an alternative, only one side of the inner ring, i. e. the raceway of the rolling elements may be subjected to a surface treatment. The advantageously thin-walled inner ring can adapt itself to the contour of the peripheral surface of the trunnion despite surface treatment.

The components forming the roller assembly, viz., the inner ring, the rolling elements and the tripod roller are all size-matched. This assures that the required radial play in the constant velocity universal joint is guaranteed after the installation of the tripod assembly.

Further features of the invention will become evident from the drawings and the description of the figures which show one example of embodiment.

DETAILED DESCRIPTION OF THE PREFERRED EMBODIMENT

Figure 1:
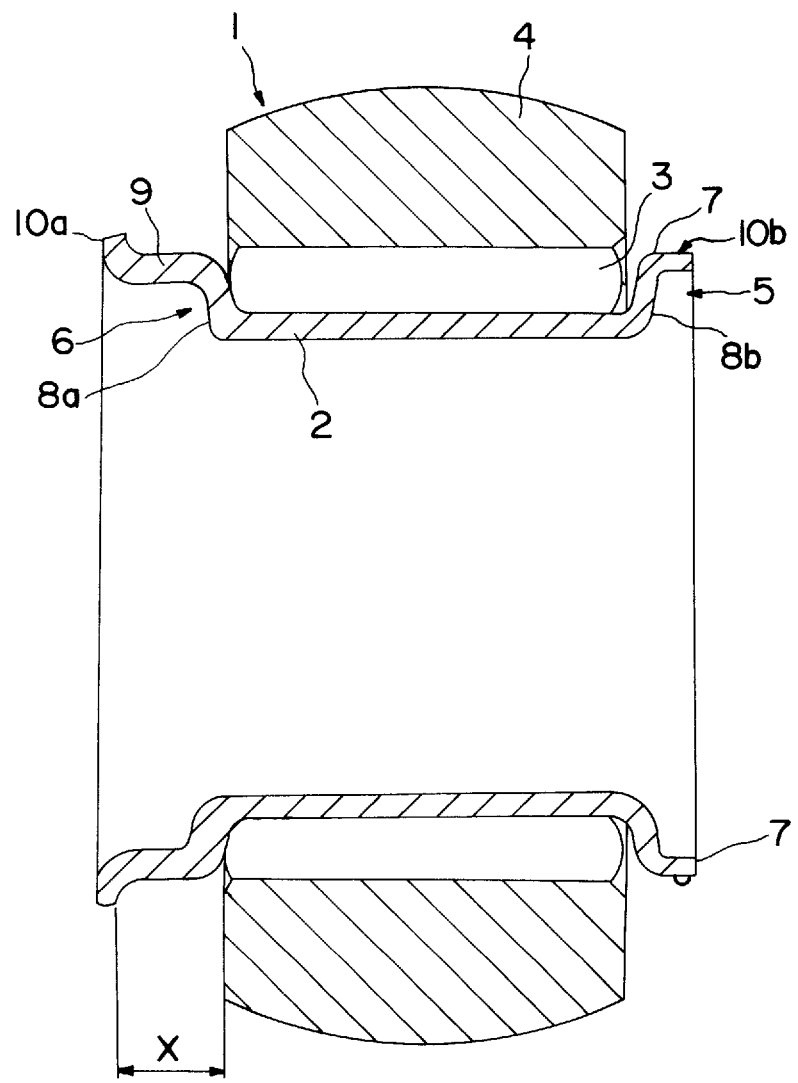
FIG. 1 is a longitudinal cross-section of a roller assembly of the invention.

FIG. 1 shows a roller assembly 1 of the invention composed of an inner ring 2, rolling elements 3 and a tripod roller 4. The axial extent of the inner ring 2 which is made as a deep drawn sheet metal part is larger than the axial extent of the tripod roller 4. Flanges 5, 6 of the inner ring 2 bear against ends of the rolling elements 3. At its radially outer end, the flange 5 merges into an axial portion 7 on whose outer periphery is arranged a plurality of spaced retaining lugs 8a and 8b. The flange 6 comprises a similarly formed axial portion 9 which, however, instead of having lugs, merges into a flanges 10a and 10b. Starting from the neutral position shown in FIG. 1, the tripod roller 4 can be axially displaced through a distance "X" before abutting against the flanges 10a and 10b. An axial displacement of the tripod roller 4 in the opposite direction is stopped at the retaining lug 8a and 8b or the tripod spider 11 (see FIG. 2). The retaining lugs 8 arranged on the outer periphery of the axial portion 7 can be made, for example, by making local stampings or incisions in the portion 7 and bending these radially outwards. For assembling the components of the tripod assembly 1, these lugs 8a and 8b are elastically deformed. They also consitute a safety device against separation of the individual components from the roller assembly 1.

Figure 2:
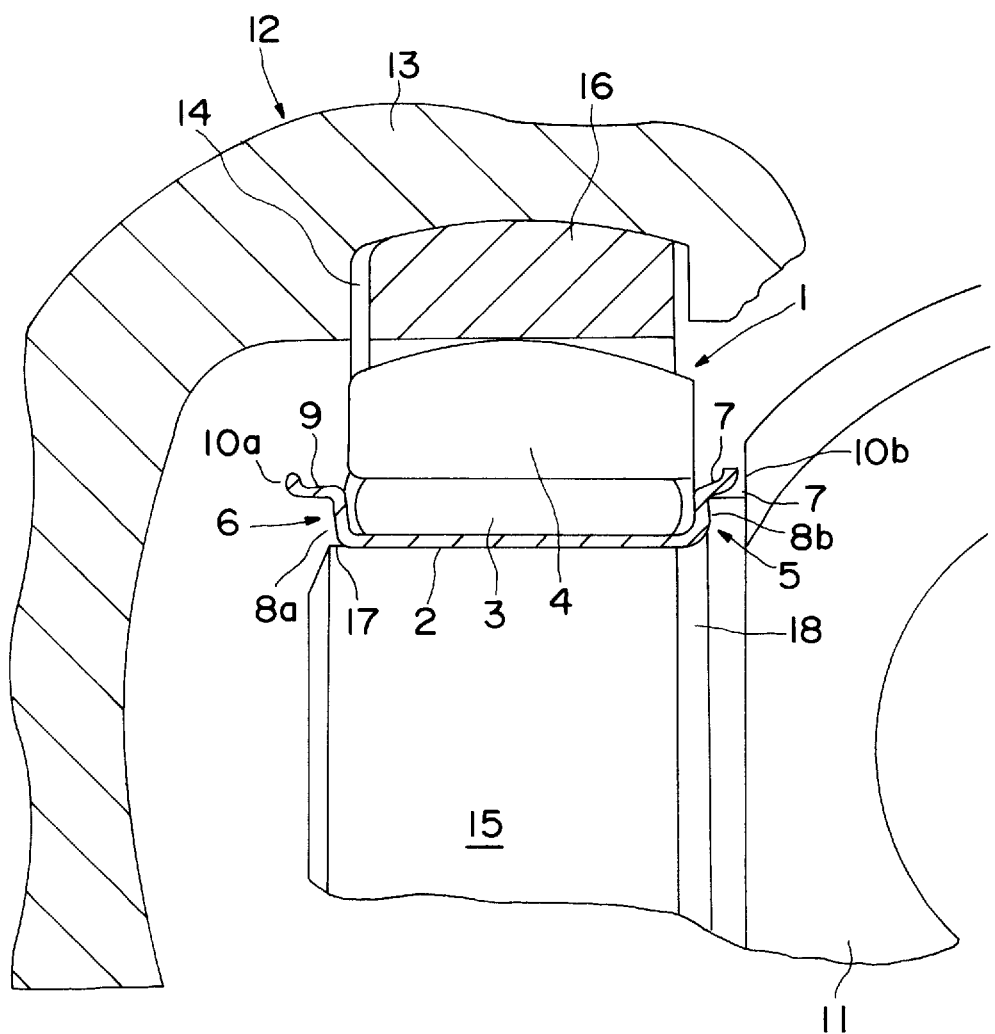
Fig. 2 shows the roller assembly of FIG. 1 in the installed state.

FIG. 2 shows the tripod roller assembly 1 as installed in a constant velocity universal joint 12. The convex outer surface of the tripod roller 4 serves to guide the tripod roller assembly 1 in the outer ring 16 which is inserted into a longitudinal recess 14 of the outer joint member 13. The inner ring 2 is pressed onto the trunnion 15 of the tripod spider 11 whereby the inner contour of the inner ring 2 adapts itself to the peripheral surface 17 of the trunnion 15. From FIG. 2 it can be clearly seen that an unobstructed axial displacement of the tripod roller 4 is enabled by the inner ring 2 of the invention in case the constant velocity universal joint 12 has to bridge large angles of bend. An undercut 18 made in the form of a radial circumferential groove in the peripheral surface 1 7 of the trunnion 15 at the transition to the tripod spider 11 serves to improve the strength of the trunnion 15.

List of Reference Numbers

1 Roller assembly
2 Inner ring
3 Rolling elements
4 Tripod roller
5 Flange
6 Flange
7 Portion
8 Retaining lug
9 Portion
10 Flange
11 Tripod spider
12 Constant velocity universal joint
13 Outer joint member
14 Recess
15 Trunnion
16 Outer ring
17 Peripheral surface
18 Undercut

We claim:

1. A tripod type constant velocity universal joint comprising an outer joint member having longitudinal recesses arranged in spaced relationship on a periphery thereof, and trunnions symmetrically arranged on a tripod spider, said trunnions located in said recesses of the outer joint member, rolling elements surrounding the trunnions and having tripod rollers mounted thereon, characterized in that an inner ring (2) formed without chip removal from sheet metal is arranged between each trunnion (15) and the respective rolling elements (3), the inner ring (2), the tripod roller (4) and the rolling elements (3) form a roller assembly (1), and the inner ring (2) comprises at least first and second radially stepped end flanges (5, 6) extending so to radially overlap the radially inner and outer surfaces of the rolling elements and the tripod roller, each of the stepped flanges including radially inner stops (8a, 8b) for engaging the rolling elements (3) and radially outer stops (10a, 10b) for engaging the tripod roller (4).

2. A universal joint of claim 1 wherein the tripod roller (4), the rolling elements (3) and the inner ring (2) constitute a pre-assemblable roller assembly (1).

3. A universal joint of claim 1 wherein the rolling elements (3) are supported directly on the radially inner stops (8a, 8b) of the flanges (5, 6), and the radially outer stops (10a, 10b) are axially spaced from the radially inner stops (8a, 8b) by a first axial portion (9) and a second axial portion (7).

4. A universal joint of claim 3 wherein an axial length of the first axial portion (9) is larger than an axial length of the second axial portion 7.

5. A universal joint of claim 1 wherein a plurality of retaining lugs (8) are arranged in spaced relationship on a periphery of the second axial portion (7).

6. A universal joint of claim 1 wherein the inner ring (2) is pressed onto the trunnion (15).

7. A universal joint of claim 1 wherein an axial securing for the inner ring (2) is axially secured on an end of the trunnion (15).

8. A universal joint of claim 1 wherein a radial circumferential undercut (18) is arranged in a transition region between a peripheral surface (17) of the trunnion (15) and the tripod spider (11).

9. A universal joint of claim 1 wherein the inner ring (2) is made as a deep drawn part.

10. A universal joint of claim 1 wherein at least a part of the inner ring (2) is subjected to a heat treatment for obtaining a raceway for the rolling elements (3).

11. A universal joint of claim 1 wherein all components of the roller assembly (1) are selected by matching sizes to respect a required radial play in the universal joint (12).

* * * * *